(12) United States Patent
Borland

(10) Patent No.: US 6,314,551 B1
(45) Date of Patent: Nov. 6, 2001

(54) SYSTEM PROCESSING UNIT EXTENDED WITH PROGRAMMABLE LOGIC FOR PLURALITY OF FUNCTIONS

(75) Inventor: David J. Borland, Austin, TX (US)

(73) Assignee: Morgan Stanley & Co. Incorporated, New York, NY (US)

( * ) Notice: Subject to any disclaimer, the term of this patent is extended or adjusted under 35 U.S.C. 154(b) by 0 days.

(21) Appl. No.: 09/102,465

(22) Filed: Jun. 22, 1998

(51) Int. Cl.$^7$ .................... H03K 17/693; H03K 19/173; H03K 19/177; G06F 7/38
(52) U.S. Cl. ................. 716/17; 716/16; 326/37; 326/38; 326/39
(58) Field of Search .................... 716/16, 17; 710/129; 701/36; 711/112; 712/37, 39; 326/37–39

(56) References Cited

U.S. PATENT DOCUMENTS

| | | | |
|---|---|---|---|
| 5,260,881 | * 11/1993 | Agrawal et al. | 716/16 |
| 5,321,845 | * 6/1994 | Sawase et al. | 712/37 |
| 5,600,845 | * 2/1997 | Gilson | 712/39 |
| 5,640,106 | 6/1997 | Erickson et al. | 326/38 |
| 5,644,496 | 7/1997 | Agrawal et al. | 716/17 |
| 5,682,107 | 10/1997 | Tavana et al. | 326/41 |
| 5,687,325 | 11/1997 | Chang | 716/17 |
| 5,692,147 | 11/1997 | Larsen et al. | 711/202 |
| 5,838,954 | * 11/1998 | Trimberger | 716/16 |
| 5,848,367 | * 12/1998 | Lotocky et al. | 701/36 |
| 6,047,115 | * 4/2000 | Mohan et al. | 716/16 |
| 6,065,087 | * 5/2000 | Keaveny et al. | 710/129 |
| 6,085,285 | * 7/2000 | Lucas et al. | 711/112 |

* cited by examiner

*Primary Examiner*—Matthew Smith
*Assistant Examiner*—Jibreel Speight

(57) ABSTRACT

An integrated circuit including a main system processing unit which can be extended using a plurality of programmable logic unit for a plurality of possible functions, and a system for programming same. The integrated circuit also includes a plurality of functional logic blocks, a plurality of input/output (I/O) pads, and programmable logic coupled to each of the plurality of functional logic blocks. The main system processing unit is operable to perform a first function. Each of the plurality of functional logic blocks is operable to perform a respective function. The programmable logic is operable to route data to and from various ones of the plurality of functional logic blocks. The programmable logic is programmable to configure operation of two or more of the plurality of functional logic blocks and is also programmable to create data paths between two or of the plurality of functional logic blocks to configure the integrated circuit for one of the plurality of functions. The plurality of I/O pads is coupled to the main system processing unit and the plurality of functional logic blocks. The I/O pads are operable to transfer data signals between the integrated circuit and an external device. The programmable logic may perform a function different from each of the plurality of functional logic blocks. The system for programming the integrated circuit includes a computer system, the integrated circuit, and a cable for coupling the two.

16 Claims, 3 Drawing Sheets

SYSTEM PROCESSING UNIT EXTENDED WITH PROGRAMMABLE LOGIC FOR PLURALITY OF FUNCTIONS

BACKGROUND OF THE INVENTION

1. Field of the Invention

This invention relates to integrated circuits in general and, more particularly, to a system processing unit which can be extended using a plurality of programmable logic units for a plurality of functions.

2. Description of Related Art

The concepts of integrated circuits and computer systems are generally well known. A typical computer system is made up of a multitude of different, specialized computer chips. Chip makers can now place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. Economies of scale in manufacturing require that start-up costs be amortized over as many pieces of a product as possible to keep per-unit costs low. Custom integrated circuits are usually only produced in limited numbers, making the per-unit costs much higher than standard integrated circuits. This makes many custom integrated circuits uncompetitive in the marketplace. Therefore, an improved system is desired which allows a variety of custom integrated circuits to be designed and manufactured as a single integrated circuit, so that start-up costs can be amortized over a plurality of different integrated circuit products.

SUMMARY OF THE INVENTION

The present invention comprises a main system processing unit which can be extended using a plurality of programmable logic units for a plurality of possible functions. The main system processing unit is preferably comprised in an integrated circuit. The integrated circuit also includes a plurality of functional logic blocks, a plurality of input/output (I/O) pads, and programmable logic coupled to each of the plurality of functional logic blocks. The main system processing unit is operable to perform a first function. Each of the plurality of functional logic blocks is operable to perform a respective function. The pro(grammable logic is operable to route data to and from various ones of the plurality of functional logic blocks. The programmable logic is also programmable to configure operation of two or more of the plurality of functional logic blocks and is also programmable to create data paths between two or more of the plurality of functional logic blocks to configure the integrated circuit for one of the plurality of possible functions. The plurality of I/O pads are coupled to the main system processing unit and the plurality of functional logic blocks. The I/O pads are operable to transfer data signals between the integrated circuit and an external device.

In one embodiment, the programmable logic is further configurable to perform a function different from each of the plurality of functional logic blocks. The programmable logic is preferably non-volatile. The integrated circuit preferably further comprises a memory for storing program instructions executable by the main system processing unit. In this embodiment, the main system processing unit is operable to program the programmable logic in response to execution of the program instructions. The program instructions may be downloadable from an external device. In another embodiment, the programmable logic is further configurable to selectively disable one or more of the functional logic blocks. In still another embodiment, one or more functional blocks may be selectably permanently disabled during configuration or manufacture, that is, the one or more functional blocks to be disabled are no longer functional for their respective original purpose.

In another embodiment, the programmable logic is further coupled to the main system processing unit and the plurality of I/O pads, and the programmable logic is further operable to route data to and from the main system processing unit and the plurality of I/O pads. In yet another embodiment, the functional logic blocks include a first group of functional logic blocks and a second group of functional logic blocks, with the second group of functional logic blocks being redundant ones of the first group of functional logic blocks. The programmable logic is operable to route data to one of the first group of functional logic blocks and a respective one of the second group of functional logic blocks. The programmable logic is preferably further configurable to reroute data bound to and from one of the first group of functional logic blocks to a redundant one of the second group of functional logic blocks.

A system is also disclosed for configuring the integrated circuit for one of a plurality of possible functions. The system comprises a computer system, the integrated circuit, and a cable for operatively coupling the computer system and the integrated circuit. The computer system preferably includes a system bus for transferring commands and data, a processor coupled to said system bus, a memory which is operable to store commands and data in a form accessible by the processor, and an I/O port coupled to said system bus. The processor is operable to execute the commands and operate on the data, and the I/O port is operable to conduct programming instructions and data in response to processor operation. The integrated circuit is coupled to the I/O port and receives the programming instructions and data from the I/O port which operates to configure the integrated circuit. The integrated circuit is configurable for a plurality of possible functions and includes a main system processing unit, a plurality of functional logic blocks, programmable logic, and a plurality of I/O pads.

The plurality of I/O pads are operable to transfer data signals between the I/O port of the computer system and the integrated circuit. The processor is operable to execute an application which provides the programming instructions and data to the I/O port, wherein the programming instructions and data operate to configure the integrated circuit with one of the plurality of possible functions. The application configures the programmable logic on the integrated circuit through the I/O port, and the integrated circuit receives a configuration from the application through the I/O pads. The cable preferably couples the I/O port and the I/O pads. In one embodiment, the I/O port includes a plurality of computer system I/O pins, and the integrated circuit further includes a plurality of I/O pins operatively coupled to the plurality of I/O pads. One or more of the I/O pads is operable to accept I/O from one or more of the plurality of I/O pins.

BRIEF DESCRIPTION OF THE DRAWINGS

A better understanding of the present invention can be obtained when the following detailed description of the preferred embodiment is considered in conjunction with the following drawings, in which.

Figure 1:
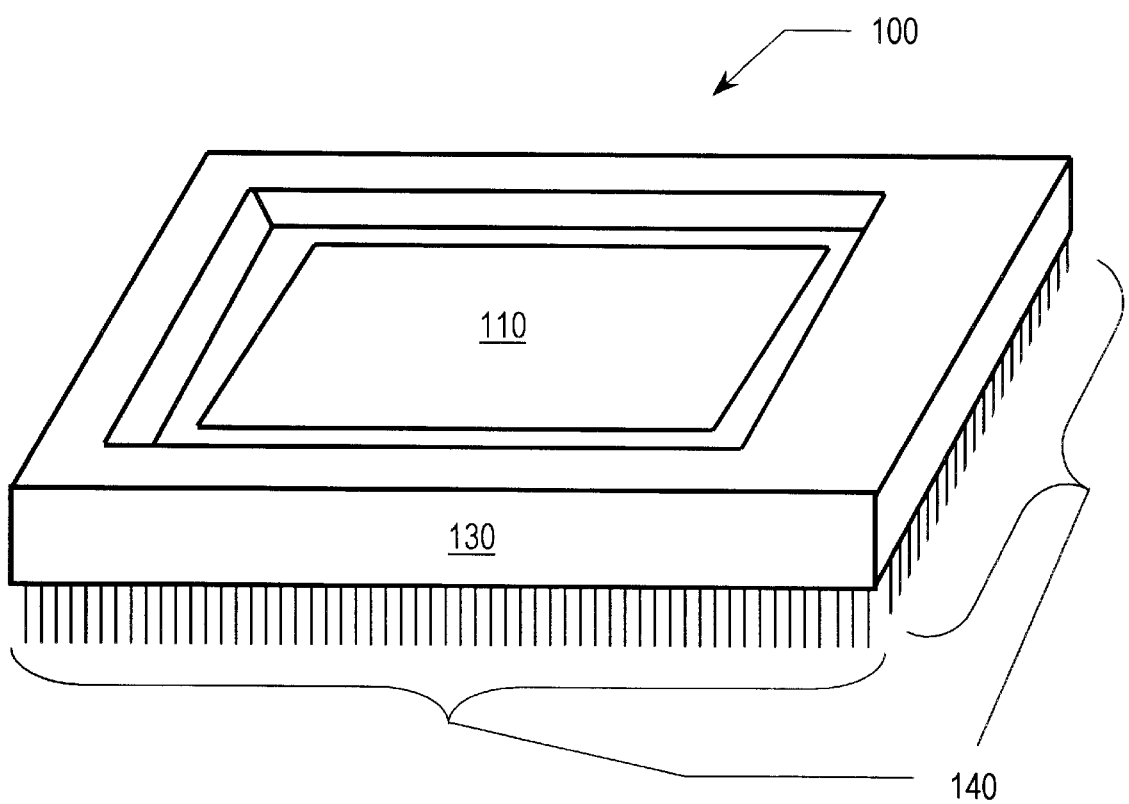
FIG. 1 illustrates a prospective, cut-away view of a computer chip.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The present invention comprises a device and system for extending, a main system processing unit with programmable lomuc for a plurality of functions The use of a letter as part of a number desirnating a component of a system described in this document will be to show multiple instances of equivalent components. All figures will use a uniform numbering system with identical or similar parts across the figures being given identical numbers FIG. 1—Computer Chip Referring now to FIG. 1, a computer chip 100 i s shown from a perspective, cut-away view. Integrated circuit 110 of cocomputer chip 100 preferably comprises a monolithic silicon substrate comprising, a plurality of transistors. The integrated circuit 110 may also use gallium arsenide (GaAs) or another suitable semiconductor material; the computer chip 100 may also use optical transmission. Although shown as a ceramic socket mount pin grid array (PGA) package 130 with pins 140, the integrated circuit 110 may be packaged in any of various ways, including as a surface mount, socket mount, or insertion/socket mount. Materials used in the packaging 130 of integrated circuit 110 may include ceramic packages, leadless chip carrier packages (LCC), glass-sealed packages, or plastic packages. Actual type of chip packages 130 for computer chip 100 may include, ceramic quad flatpack (CQFP), PGA, ceraoic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

In one embodiment, integrated circuit 110 comprises a devain system processing unit which can be extended using a plurality of programmable logic unit for a plurality of possible functions. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIG. 2.

Figure 2:
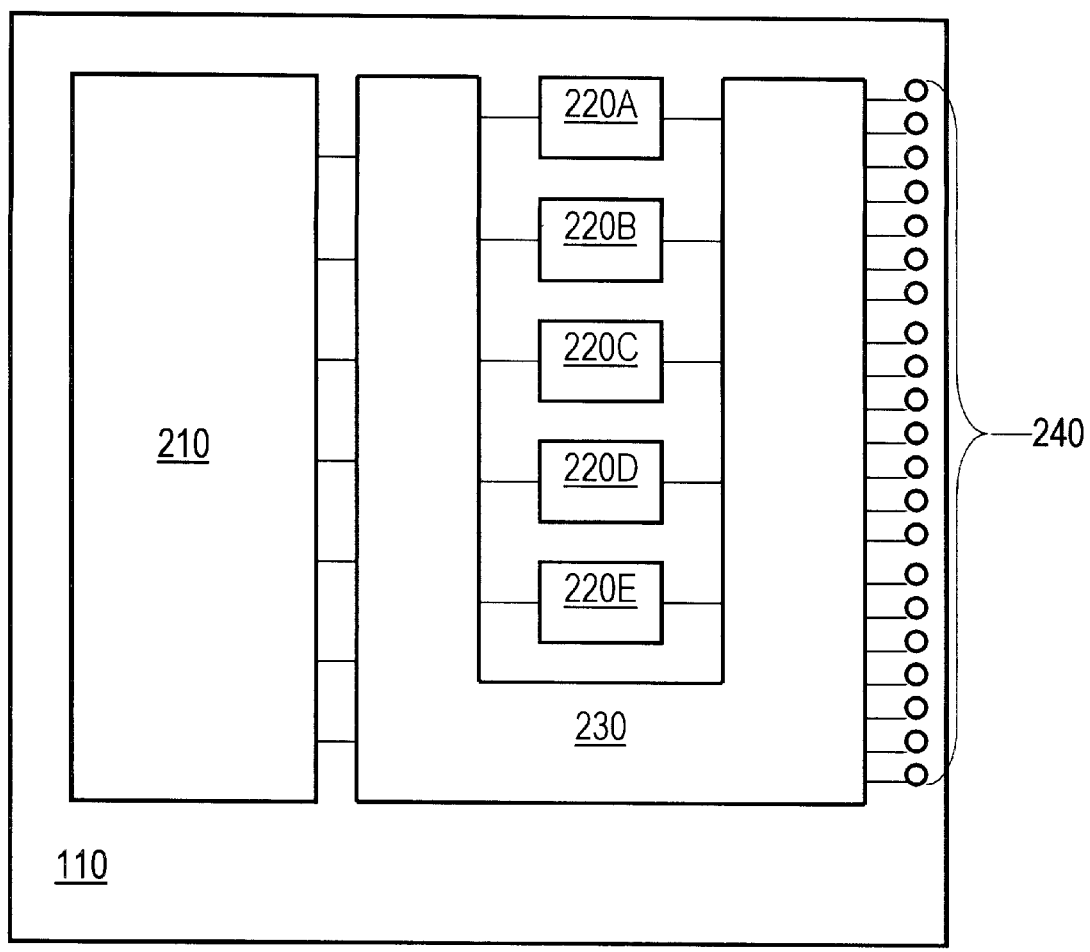
FIG. 2 illustrates a top view of a block diagram of an embodiment of the semiconductor portion of the integrated circuit, according to the present invention.

FIG. 2—Configurable Integrated Circuit

A more detailed look is seen of one embodiment of the integrated circuit 110 in FIG. 2. The main system processing unit 210 is preferably comprised in the integrated circuit 110, which also includes a plurality of functional logic blocks 220A–220E, a plurality of input/output (I/O) pads 240, and programmable logic 230 coupled to each of the plurality of functional logic blocks 220. The main system processing unit 210 is operable to perform a first function. It is contemplated that the first function of main system processing unit 210 could be that of a central processing unit or digital signal processor, or a complex module or modules with a variety of computational and storage capabilities.

Each of the plurality of functional logic blocks 220 is operable to perform a respective function. These functions may be as filters, transforms, or of other various computational or relational varieties. The programmable logic 230 is operable to route data to and from various ones of the plurality of functional logic blocks 220. The programmable logic 230 is programmable to configure operation of two or more of the plurality of functional logic blocks 220 and is also programmable to create data paths between two or more of the plurality of functional logic blocks 220 to configure the integrated circuit 110 for one of the plurality of possible functions. The plurality of I/O pads 240 are coupled to the main system processing unit 210 and the plurality of functional logic blocks 220. The I/O pads 240 are operable to transfer data signals between the integrated circuit 110 and an external device, such as 310 in FIG. 3.

In one embodiment, the programmable logic 230 is further configurable to perform a function different from each of the plurality of functional logic blocks 220. The programmable logic may be volatile or non-volatile, as desired The integrated circuit 110 preferably further comprises a memory (not shown) for storing program instructions executable by the main system processing unit 210. In this embodiment, the main system processing unit 210 is operable to pro(gram the programmable logic 230 in response to execution of the program instructions. In one embodiment, the memory is comprised in the main system processing unit 210. The program instructions may be downloadable from the external device. In another embodiment, the programmable logic 230 is further configurable to selectively disable one or more of the functional logic blocks 220. In still another embodiment, selectively disabling one or more functional blocks is permanent; that is, the one or more functional blocks to be disabled are no longer functional for their respective original purpose. For example, in an integrated circuit 110 which includes functional blocks 220A–220Z, to create an integrated circuit 110 that is limited to only certain capabilities, all but two functional blocks, 220A and 220R, may be disabled.

In another embodiment, the programmable logic 230 is further coupled to the main system processing unit 210 and the plurality of I/O pads 240, and the programmable logic 230 is further operable to route data to and from the main system processing unit 210 and the plurality of I/O pads 240. In yet another embodiment, the functional logic blocks 220 include a first group of functional logic blocks 220A/B and a second group of functional logic blocks 220C/D, with the second group of functional logic blocks 220C/D being redundant ones of the first group of functional logic blocks 220A/B. The programmable logic 230 is operable to route data to one 220A of the first group of functional logic blocks 220A/B and a respective one 220C of the second group of functional logic blocks 220C/D. The programmable logic 230 is preferably further configurable to reroute data bound to and from one 220B of the first group of functional logic blocks 220A/B to a redundant one 220D of the second group of functional logic blocks 220C/D.

In yet another embodiment, the integrated circuit 110 is operable to dynamically reconfigure the programmable logic 230 in response to program instructions or in response to a result of monitoring program instructions. This self-configuring execution of programming allows the integrated circuit 110 to monitor operations within the integrated circuit 110 and reprogram the programmable logic 230 as needed for efficient operation. In one embodiment, the integrated circuit 110 reprograms the programmable logic 230 in response to a static condition, such as stand-by, to act as a hardware monitor for power savings. Lower power consumption may be preferably achieved by substituting hardware monitoring for software monitoring. A signal input preferably activates the integrated circuit 110 to reprogram the programmable logic 230 in response to the signal input. Various configurations are preferably stored in the memory for programming the programmable logic 230. Monitoring the operations within the integrated circuit 110 include monitoring the program instructions either as they are executed or as the program instructions are fetched or queued. Contemplated embodiments of monitoring the program instructions include counting how many times a program sequence occurs or the fetching of a particular instruction or sequence of instructions.

In a preferred embodiment, the integrated circuit 110 is housed and protected inside packaging 130. One or more of the plurality of I/O pins 240 are coupled to one or more pins 140. Through the pins 140, the integrated circuit 110 may be operably coupled to a computer system 310 for programming the pro(grammable logic 230 in such a way as to configure the integrated circuit 110 for one of the plurality of possible functions for which the integrated circuit 110 was designed. Additional details on the computer system 310 are given with respect to FIG. 3 below.

Figure 3:
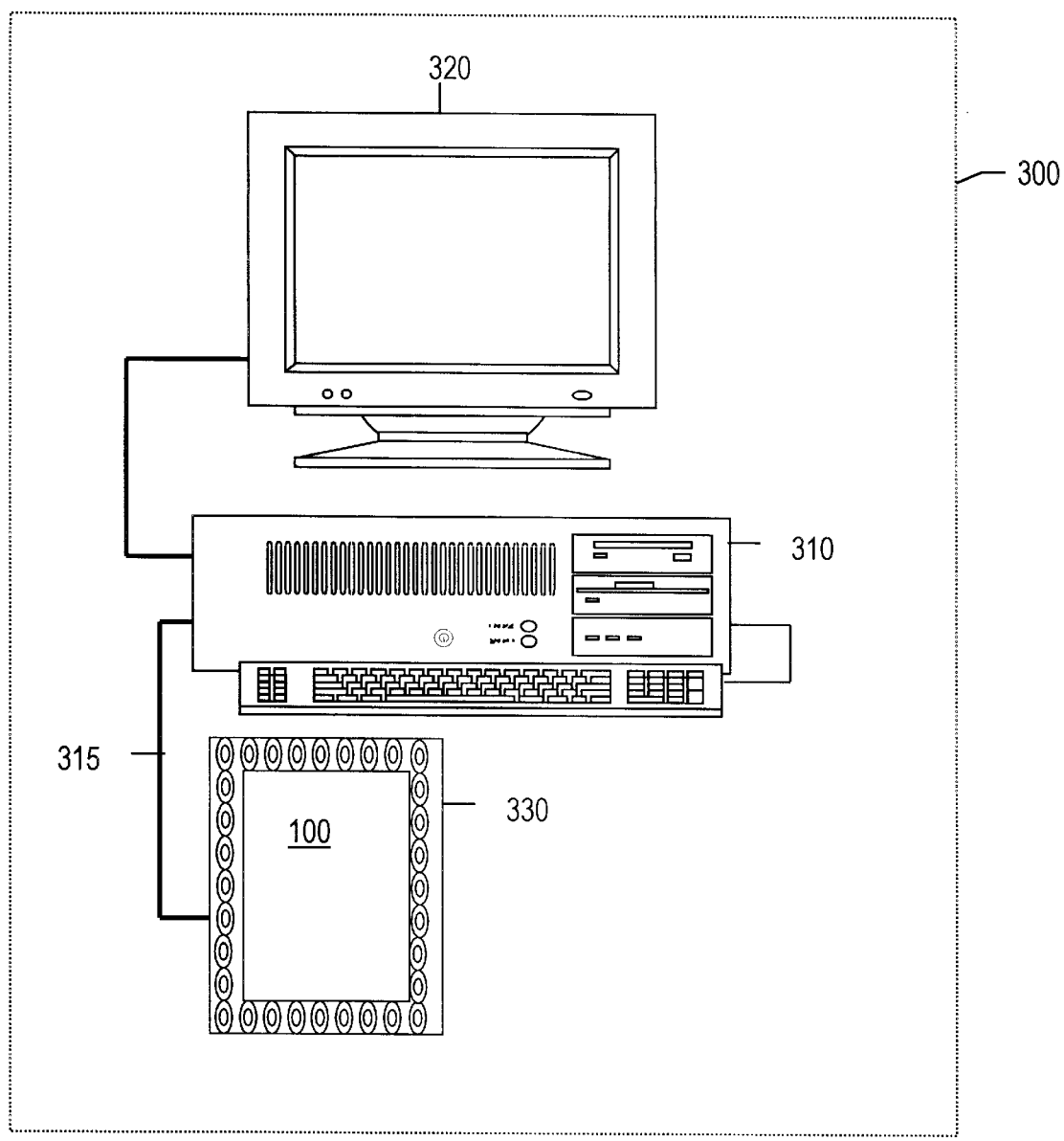
FIG. 3 illustrates an embodiment of a system for programming the integrated circuit of FIG. 2, according to the present invention.

FIG. 3—System for Configuring the Integrated Circuit

Referring now to FIG. 3, an embodiment of a system 300 for configuring integrated circuits 110 of computer chips 100 to one of the plurality of possible functions is shown. The system 300 comprises a computer system 310, optionally with a monitor 320, which couples to a programming pad 330. Programming pad 330 operationally couples to the integrated circuit 110 for programming the programmable logic 230, which is a part of the integrated circuit 110, such that the integrated circuit 110 can perform one of the plurality of possible functions. The minimum requirements for the computer system include a system bus, a processor and a memory controller each coupled to the system bus, a memory coupled to the memory controller, and an I/O port coupled to the system bus.

The system bus transfers commands and data between devices coupled to the system bus. The processor executes the commands and operates on the data. The memory stores the commands and the data in a form accessible by the processor. The I/O port conducts programming instructions and data from the computer system 310 to the integrated circuit 100. The computer system 310 and the programming pad 330 operationally connect via electrical or optical couplings 315, such as one or more cables, wires, or optical fibers, as desired. It is also contemplated that radio waves or similar frequency of electromagnetic radiation might be used to program the integrated circuit 100, allowing for a cable-less design.

The system 300 is operable to configure the integrated circuit 110 for one of the plurality of possible functions. The system comprises a computer system 310, computer chip 100 including the integrated circuit 110, and a cable 315 for operatively coupling the computer system 210 and the computer chip 100 including the integrated circuit 110. The computer system preferably includes a system bus for transferring commands and data, a processor coupled to said system bus, a memory which is operable to store commands and data in a form accessible by the processor, and an I/O port coupled to said system bus. The processor is operable to execute the commands and operate on the data, and the I/O port is operable to conduct programming instructions and data in response to processor operation. The integrated circuit 110 is configurable for a plurality of possible functions and includes a main system processing unit 210, a plurality of functional logic blocks 220, programmable logic 230, and a plurality of I/O pads 240.

The plurality of I/O pads 240 are operable to transfer data signals between the integrated circuit 110 and the I/O port of the computer system 310. The processor is operable to execute an application which provides the programming instructions and data to the I/O port, wherein the programming instructions and data operate to configure the integrated circuit 110 with one of the plurality of possible functions. The application configures the programmable logic 230 on the integrated circuit 110 through the I/O port, and the integrated circuit 110 receives a configuration from the application through the I/O pads 240. The cable 315 preferably couples the I/O port and the I/O pads 240. In one embodiment, the I/O port includes a plurality of computer system I/O pins, and the computer chip 100 including the integrated circuit 110 further includes a plurality of I/O pins 140 operatively coupled to the plurality of I/O pads 240. One or more of the I/O pads 240 is operable to accept I/O from one or more of the plurality of I/O pins 240.

Therefore, the present invention comprises a main system processing unit which can be extended using a plurality of programmable logic unit for a plurality of possible functions and a system for programming, same. Although the device and system of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit configurable for a plurality of possible functions, the integrated circuit comprising:

a main system processing unit;

a plurality of functional logic blocks, wherein the plurality of functional logic blocks are coupled to the main system processing unit, wherein each of the plurality of functional logic blocks is operable to perform a respective function;

programmable logic coupled to each of the plurality of functional logic blocks, wherein the programmable logic is operable to route data to and from various ones of the plurality of functional logic blocks, wherein the programmable logic is programmable to configure operation of two or more of the plurality of functional logic blocks and is programmable to create data paths between two or more of the plurality of functional logic blocks to configure the integrated circuit for one of the plurality of possible functions, wherein the main system processing unit is operable to program the programmable logic, and wherein the programmable logic is further configurable to selectively disable one or more of the functional logic blocks; and a plurality of input/output (I/O) pads, wherein the plurality of I/O pads are coupled to the main system processing unit and the plurality of functional logic blocks, wherein the plurality of I/O pads are operable to transfer data signals between the integrated circuit and an external device.

2. The integrated circuit of claim 1, wherein the programmable logic is further configurable to perform a function different from each of the plurality of functional logic blocks.

3. The integrated circuit of claim 1, wherein the programmable logic is non-volatile.

4. The integrated circuit of claim 1, further comprising:
a memory for storing program instructions executable by the main system processing unit; wherein the main system processing unit is operable to program the programmable logic in response to execution of said program instructions.

5. The integrated circuit of claim 4, wherein the main system processing unit is monitoring the program instructions, wherein the main system processing unit is operable to program the programmable logic in response to said monitoring the program instructions.

6. The integrated circuit of claim 4, wherein the program instructions are downloadable from the external device.

7. The integrated circuit of claim 1, wherein said selectively disable one or more functional blocks is permanent, wherein permanent comprises the one or more functional blocks to be disabled being no longer functional for their respective original purpose.

8. The integrated circuit of claim 1, wherein the programmable logic is further coupled to the main system processing unit and the plurality of I/O pads, wherein the programmable logic is further operable to route data to and from the main system processing unit, wherein the programmable logic is further operable to route data to and from the plurality of I/O pads.

9. The integrated circuit of claim 8, wherein the plurality of functional logic blocks include a first group of functional logic blocks and a second group of functional logic blocks, wherein the second group of functional logic blocks are redundant ones of the first group of functional logic blocks, wherein the programmable logic is operable to route data to one of the first group of functional logic blocks and a respective one of the second group of functional logic blocks.

10. The integrated circuit of claim 9, wherein the programmable logic is further configurable to reroute data bound to and from one of said first group of functional logic blocks to a redundant one of said second group of functional logic blocks.

11. The integrated circuit of claim 1 is further operable to dynamically reconfigure the programmable logic.

12. The integrated circuit of claim 11, wherein the dynamic reconfiguration of the programmable logic is in response to a program instruction, wherein the program instruction is executable by the main system processing unit.

13. The integrated circuit of claim 1, wherein one of the plurality of possible functions comprises one or more of: a filter function, a transformation function, a computation function, and a relational function.

14. A system for configuring an integrated circuit for one of a plurality of possible functions, the system comprising:
a computer system, wherein said computer system includes:

a system bus for transferring commands and data;
a processor coupled to said system bus, wherein said processor is operable to execute said commands and operate on said data;
a memory which is operable to store said commands and said data in a form accessible by said processor; and
an I/O port coupled to said system bus, wherein said I/O port is operable to conduct programming instructions and data in response to processor operation; and
the integrated circuit, wherein the integrated circuit is configurable for a plurality of possible functions, wherein said integrated circuit includes:
a main system processing unit;
a plurality of functional logic blocks, wherein the plurality of functional logic blocks are coupled to the main system processing unit, wherein each of the plurality of functional logic blocks is operable to perform a respective function;
programmable logic coupled to each of the plurality of functional logic blocks, wherein the programmable logic is operable to route data to and from various ones of the plurality of functional logic blocks, wherein the programmable logic is programmable to configure operation of two or more of the plurality of functional logic blocks and is programmable to create data paths between two or more of the plurality of functional logic blocks to configure the integrated circuit for one of the plurality of possible functions, wherein the main system processing unit is operable to program the programmable logic, and wherein the programmable logic is further configurable to selectively disable one or more of the functional logic blocks; and
a plurality of input/output (I/O) pads, wherein the plurality of I/O pads are coupled to the main system processing unit and the plurality of functional logic blocks, wherein the plurality of I/O pads are operable to transfer data signals between the integrated circuit and said I/O port of said computer system; and
wherein said processor is operable to execute an application which provides said programming instructions and data to said I/O port, wherein said programming instructions and data operate to configure said integrated circuit with one of said plurality of possible functions,
wherein said application configures said programmable logic on said integrated circuit through said I/O port, wherein said integrated circuit receives a configuration from said application through said I/O pads; and
a cable for operatively coupling said I/O port and said I/O pads.

15. The system of claim 14, wherein said I/O port includes a plurality of computer system I/O pins,
wherein said integrated circuit further includes:
a plurality of I/O pins operatively coupled to said plurality of I/O pads, wherein one or more of said I/O pacs is operable to accept I/O from one or more of said plurality of I/O pins,
wherein the cable couples said plurality of computer system I/O pins to said plurality of I/O pins.

16. The system of claim 15, wherein said cable includes electrical or optical couplings.

* * * * *